(No Model.)  2 Sheets—Sheet 1.
W. J. PHILIPS & G. L. KITSON.
METHOD OF AND APPARATUS FOR LAYING BRANCH UNDERGROUND ELECTRICAL CONDUCTORS.
No. 293,271.  Patented Feb. 12, 1884.
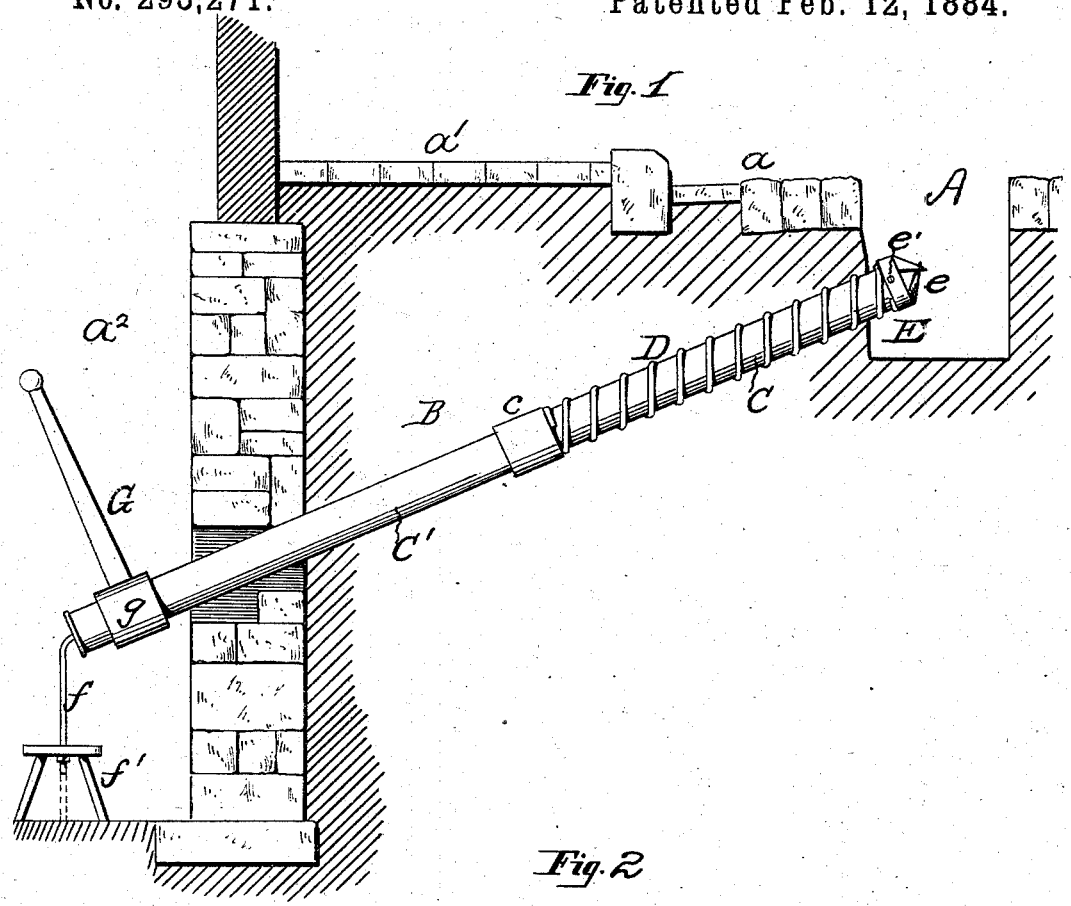
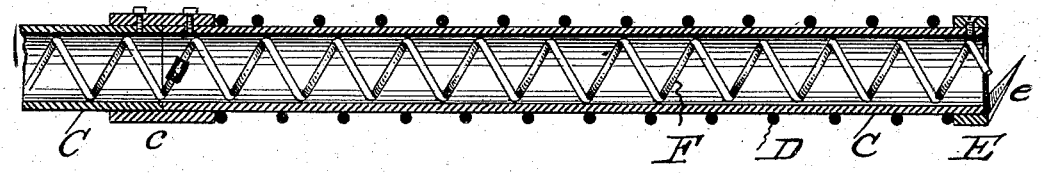
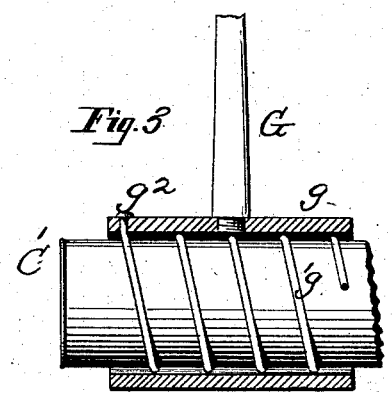
WITNESSES:  INVENTORS (No Model.) 2 Sheets—Sheet 2.
W. J. PHILIPS & G. L. KITSON.
METHOD OF AND APPARATUS FOR LAYING BRANCH UNDERGROUND
ELECTRICAL CONDUCTORS.
No. 293,271. Patented Feb. 12, 1884.
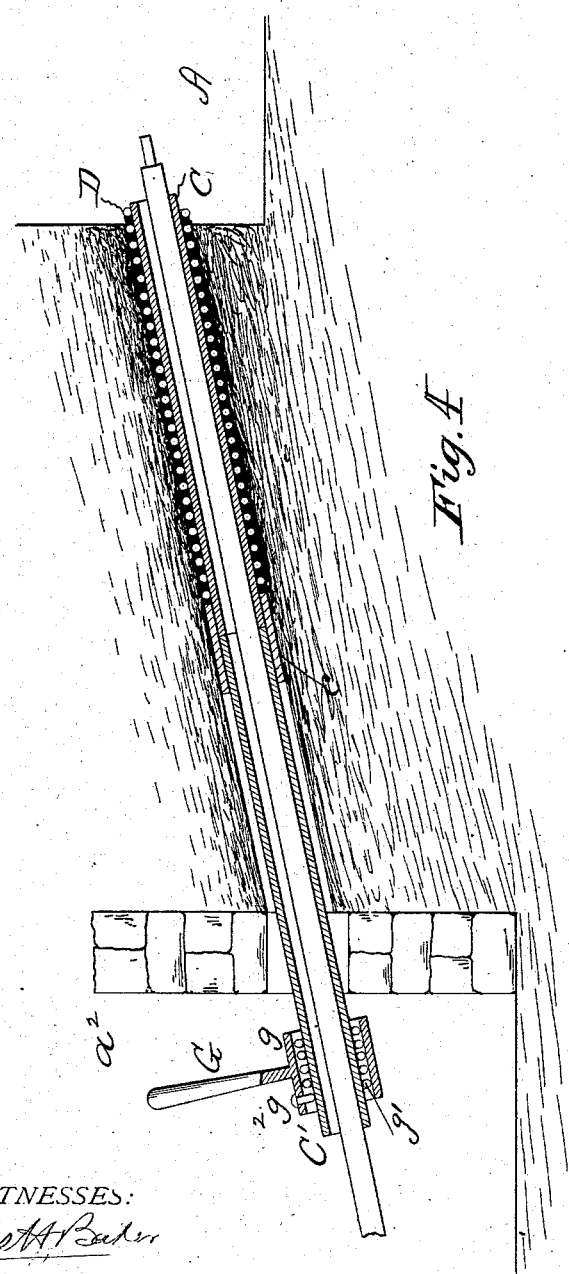
WITNESSES:
INVENTORS
W. J. Philips
G. L. Kitson
By S. J. Van Stavoren
ATTORNEY

UNITED STATES PATENT OFFICE.

WILLIAM J. PHILIPS AND GEORGE L. KITSON, OF PHILADELPHIA, PENNSYLVANIA, ASSIGNORS TO SAID PHILIPS.

METHOD OF AND APPARATUS FOR LAYING BRANCH UNDERGROUND ELECTRICAL CONDUCTORS.

SPECIFICATION forming part of Letters Patent No. 293,271, dated February 12, 1884.

Application filed March 8, 1883. (No model.)

*To all whom it may concern:*

Be it known that we, WILLIAM J. PHILIPS and GEORGE L. KITSON, citizens of the United States, residing at Philadelphia, in the county of Philadelphia and State of Pennsylvania, have invented certain new and useful Improvements in Methods of and Apparatus for Laying Branch or Lateral Underground Electrical Conductors, of which the following is a specification, reference being had therein to the accompanying drawings, wherein—

Figures 1 and 4 are elevations, partly sectional, illustrating our invention; and Figs. 2 and 3 are detail sectional views.

Our invention has relation to an improved method of and apparatus for laying branch or lateral underground electrical conductors from the main-line underground conductors to the electrical appliances located in the houses, buildings, or on fixtures situated adjacent to the main-line conductors; and it has for its object to provide a simple and inexpensive method and apparatus for accomplishing such result without necessitating the displacement of the pavements of the sidewalks and streets and the usual excavation of the ground, heretofore required for forming or providing the trench or ditch in which the branch or lateral conductor is to be laid.

Our improved method accordingly consists in first drilling or boring underground from the cellar of the houses, buildings, &c., to the main-line cables or conductors; then removing the drill-head, internal appliances, and dirt from the drill-tube, the latter remaining in its position; then passing the lateral or branch conductor through the drill-tube; then making the connections or couplings with the desired main-line conductors, and then withdrawing the drill-rod from around the lateral or branch conductor and connecting the latter to the electrical appliances located within the house or fixture wherein or whereat such operation is performed. The apparatus for practicing such method consists of a tubular drilling or boring tool having an external spirally-coiled wire or band brazed or soldered thereto on a portion of its length, a removable drill-head, and an internal spirally-coiled band or wire, which is so arranged that it may be removed from the drill-tube. Said internal spiral or helix does not rotate with the drill-tube, but is stationary, and its spirals or coils are of such pitch that they move the dirt backwardly through the drill-tube faster than the latter advances. Said apparatus further consists in the novel combination, construction, and arrangement of parts, as hereinafter more specifically described and claimed.

Referring to the accompanying drawings, A represents the ditch or trench for the reception of the main-line underground conductors, which are not shown in the drawings, as any suitable form of conductor may be used; but we prefer to employ the conductor shown in an application filed by us.

$a$ represents the street or road in which said trench is dug; $a'$, the sidewalk, and $a^2$ the cellar or basement of a building to which a branch or lateral conductor is designed to be laid from the main-line conductors. In laying such lateral or branch conductor we do not displace the pavement of the street and sidewalk, nor excavate the ground beneath the same, as has heretofore been done, but take a boring or drilling tool, B, and bore or drill an underground passage from said cellar to the main-line conductors. Said tool is composed of one or more tubular sections, C C', united by a coupling, $c$.

Upon the exterior of the section C a spiral of wire or other suitable material, D, is brazed or soldered thereto, and upon the end of said section is secured a cutter or drill-head, E, having any desirable or suitably-configured cutters, $e$ $e$. Said cutter-head is secured to section C by means of screws $e'$ $e'$, or other suitable fastening devices, so that it may be removed therefrom, as hereinafter explained.

Within the bore of the sections C C' is placed a spiral or helix of wire or other material, F, which is not connected to said sections, but loosely rests therein, while its end $f$ projects beyond the sections, and may be secured to a platform, $f'$, or may rest upon the floor of basement $a^2$, so that it will be maintained in a fixed or stationary position and not rotate with the boring or drilling tool. As the tool advances in the earth the bench is moved forward, so that the longitudinal endwise advance of the interior spiral will be provided for. The spiral F is of the same or nearly the same diameter as the interior of the sections C C', and forms a hollow core, through which the dirt will rapidly pass.

G represents an operating handle or clutch mechanism for rotating the drilling-tool, and it consists of a sleeve, $g$, having a spiral spring, $g'$, secured thereto at its end $g^2$. Said spring surrounds the section C', so that when the handle G is turned in one direction the torsional strain of the spring $g'$ causes the latter to engage with and rotate the drill; but when moved in the opposite direction the spring uncoils or is relieved of such torsional strain, and the drill remains stationary. The handle or device G is therefore a spring friction-clutch which rotates the drill. The latter is fed forwardly by the spiral D.

The operation is as follows: The drilling-tool is passed through the foundation-wall of the building and advanced into the ground by rotating the ratchet G. As the cutters $e\ e$ advance they cut through the dirt, which passes into the bore of the sections C C' until it impinges against the coils of the stationary spiral F. The coils of the latter being of a greater pitch than those of the spiral D, it follows that such dirt, as it impinges against the coils of spirals F, is moved backwardly through the sections C C' more rapidly than the cutters are advanced by the coils of the spiral D. The advancement of the cutters being, therefore, slower than the movement of the dirt through the sections C C', it follows that the cutters will never supply dirt to the bore of the sections or cut the core therefor in such quantity that it will clog or pack in said sections as it is moved therethrough. Consequently the drilling or boring operation is effected without requiring any great amount of power.

As the sections C C' are advanced into the ground other similar sections may be coupled thereto from time to time until the cutters $e\ e$ penetrate into the trench A, as shown in Fig. 1, whereupon the cutter-head E is unscrewed or removed from the section C. The spiral F is then drawn out of said sections, carrying with it all the dirt or core which may be lodged between its coils, after which the lateral or branch conductor is passed through said sections, as shown in Fig. 4. Its outer end is then connected to the desired main-line conductor in any suitable manner. The sections C C' are now reversely rotated to withdraw them from around the conductor and out of the ground, leaving said conductor lying within the tubular passage made by said sections. When the latter are withdrawn, the opposite end of the branch conductor is coupled to or placed in the circuit of the electrical appliances located in the building wherefrom such conductor is laid.

The exterior spiral on the section C may be of wire and soldered thereto, as described; or it may be a thread cut or otherwise formed on said section. So, too, while we have shown and described mechanism for manually rotating the drill, yet we do not confine ourselves thereto, as it may be operated by any suitable power applied as desired.

The device above described can be used for boring beneath railroad-tracks or other places in the path of the main-line conductors, the mode of operation therefor being the same as above set forth.

What we claim is—

1. The method herein described for laying branch or lateral conductors underground, which consists of first boring or drilling a passage-way underground to the main-line conductors, then withdrawing the core or internal appliances of the drilling-tool, then inserting the branch conductor through the drilling-tool, then coupling the branch conductor to the main-line conductor, and then withdrawing the drilling-tool, substantially as set forth.

2. The drilling or boring tool herein described, composed of a hollow tube carrying a cutter-head, an external spiral or thread, and a removable hollow spiral or helix of the same or nearly the same diameter as the hollow tube, substantially as described.

3. A drilling or boring tool composed of a hollow section carrying a removable cutter-head, an exterior feeding-spiral, and a removable hollow spiral of the same or nearly the same diameter as the hollow section, substantially as set forth.

4. A drilling or boring tool having an automatic feed arranged upon its exterior surface, and hollow internal appliances of the same diameter as the interior of the tube, for feeding the core or dirt cut by the drill through the latter, said appliances being designed and adapted to be removed from the drill, substantially as shown and described.

5. A hollow drilling or boring tool having a removable hollow spiral within, and of the same or nearly the same diameter as the interior of the tool, substantially as described.

6. A drilling or boring tool having an external thread or spiral and a removable hollow spiral of the same or nearly the same diameter as the bore of the tool, and having its coils of greater pitch than the external thread or spiral, for the purpose set forth.

7. A drilling or boring tool composed of one or more hollow sections carrying a removable cutter-head, an exterior feeding spiral or thread, an internal hollow spiral of the same or nearly the same diameter as the bore of the tool, and means for rotating said drill, substantially as described.

8. A drilling or boring tool composed of a rotating hollow section carrying a feeding-spiral and cutter-head, and an internal stationary spiral designed and adapted to be removable from said section, substantially as shown and described.

9. A drilling or boring tool composed of a rotating hollow section carrying a feeding-spiral, a removable cutter-head, and an internal stationary spiral, substantially as shown and described.

In testimony whereof we affix our signatures in presence of two witnesses.

WILLIAM J. PHILIPS.
GEORGE L. KITSON.

Witnesses:
S. J. VAN STAVOREN,
CHAS. F. VAN HORN.